United States Patent
Moon

(10) Patent No.: US 8,015,521 B2
(45) Date of Patent: Sep. 6, 2011

(54) METHOD AND SYSTEM FOR PERFORMING SEQUENTIAL EQUIVALENCE CHECKING ON INTEGRATED CIRCUIT (IC) DESIGNS

(75) Inventor: In-Ho Moon, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 480 days.

(21) Appl. No.: 12/181,638

(22) Filed: Jul. 29, 2008

(65) Prior Publication Data

US 2009/0300563 A1 Dec. 3, 2009

Related U.S. Application Data

(60) Provisional application No. 61/057,404, filed on May 30, 2008.

(51) Int. Cl.
*G06F 17/50* (2006.01)
*G06F 9/455* (2006.01)

(52) U.S. Cl. ........................ 716/107; 716/106

(58) Field of Classification Search ........... 716/106–107
See application file for complete search history.

(56) References Cited

U.S. PATENT DOCUMENTS

| 6,839,884 B1 * | 1/2005 | Narain et al. | 716/106 |
|---|---|---|---|
| 7,350,168 B1 * | 3/2008 | Mathur et al. | 716/107 |
| 7,743,354 B2 * | 6/2010 | Albrecht et al. | 716/113 |
| 7,849,428 B2 * | 12/2010 | Barowski et al. | 716/106 |
| 2007/0220461 A1 * | 9/2007 | Baumgartner et al. | 716/5 |
| 2007/0226664 A1 * | 9/2007 | Gemmeke et al. | 716/5 |
| 2008/0028347 A1 * | 1/2008 | Hiraoglu et al. | 716/5 |
| 2009/0293028 A1 * | 11/2009 | Hiraoglu et al. | 716/5 |

* cited by examiner

*Primary Examiner* — Stacy A Whitmore
(74) *Attorney, Agent, or Firm* — Park, Vaughan, Fleming & Dowler LLP

(57) ABSTRACT

One embodiment of the present invention provides a system that performs sequential equivalence checking between integrated circuit (IC) designs. During operation, the system receives a first IC design and a second IC design. Each of the first and second IC designs includes a top design level and a bottom design level, and the bottom design levels include one or more sub-blocks within the corresponding top design levels. The system then verifies if each of the sub-blocks in the bottom design level of the first design is conditionally equivalent to a corresponding sub-block in the second design. Note that two designs are conditionally equivalent if the two designs can become sequentially equivalent by adding registers on the input and output ports of the two designs. The system additionally verifies if the top design level of the first design is conditionally equivalent to the top design level of the second design and if the first design is temporally equivalent to the second design.

31 Claims, 12 Drawing Sheets

DESIGN S

DESIGN I

DESIGN S

MODIFIED DESIGN I

NON-TRANSITORY COMPUTER READABLE STORAGE MEDIUM 1200

FIG. 12

METHOD AND SYSTEM FOR PERFORMING SEQUENTIAL EQUIVALENCE CHECKING ON INTEGRATED CIRCUIT (IC) DESIGNS

RELATED APPLICATION

This application hereby claims priority under 35 U.S.C. §119 to U.S. Provisional Patent Application No. 61/057,404, filed on May 30, 2008, entitled "Compositional Verification of Retiming and Sequential Optimizations," by inventor In-Ho Moon.

BACKGROUND

1. Field of the Invention

Embodiments of the present invention generally relate to designing integrated circuits (ICs). More specifically, embodiments of the present invention relate to a method and a system for performing a compositional verification on an IC design that is both globally retimed and sequentially optimized.

2. Related Art

Dramatic improvements in semiconductor integration circuit (IC) technology presently make it possible to integrate hundreds of millions of transistors onto a single IC chip. These improvements in integration densities have been facilitated by advances in IC design and verification tools, which are now capable of designing and verifying ICs with ever-increasing complexity. In particular, one type of verification tool is used for performing equivalence checking to determine if two IC designs are functionally equivalent. As IC designs continue to become more complex, the task of verifying the equivalence between two IC designs becomes more complicated.

Among different equivalence checking tools, combinational equivalence checking (i.e., logic-level equivalence) has been the de facto standard technique for checking design equivalences for more than a decade. Meanwhile, many sequential optimization techniques have been developed that can make smaller and faster designs which consume less power. However, these sequential optimization techniques typically have to use sequential equivalence checking tools for design equivalence verification. Note that sequential equivalence checking can be a much harder verification problem than combinational equivalence checking, because the former typically requires sequential analysis on designs that often have a large number of registers. Note that the challenges associated with sequential equivalence checking become more pronounced for larger IC designs.

Recently, a number of practical techniques for performing sequential equivalence checking on fairly large designs have been proposed. In particular, one technique provides a compositional approach for performing sequential equivalence checking, which is referred to as "weak alignability" (see Z. Khasidashvili, et al., *Theoretical framework for compositional sequential hardware equivalence verification in presence of design constraints*, Proceedings of the International Conference on Computer-Aided Design, pp. 58-65, November 2004). Note that the term "alignability" was introduced by Pixley (C. Pixley, *A theory and implementation of sequential hardware equivalence*, IEEE Transactions on Computer-Aided Design, 11 (12):1469-1478, December 1992) as a notion of sequential equivalence without a known reset state. Weak alignability is a compositional extension of Pixley's original alignability which is not compositional. One important advantage of the weak alignability technique is that the compositionality is applicable to combinational equivalence checking and the verification can be performed on an abstraction/refinement scheme. However, a problem associated with the weak alignability technique is that the proposed compositionality cannot be efficiently applied to designs that are globally retimed (see I.-H. Moon, P. Bjesse, and C. Pixley, *A compositional approach to the combination of combinational and sequential equivalence checking of circuits without known reset states*, Proceedings of the Design Automation and Test in Europe Conference, pp. 1170-1175, 2007). This is because the equivalence on retimed design sub-blocks is broken even though the design equivalence is preserved.

Note that retiming is a sequential transformation technique that allows registers to be moved across combinational logic blocks while preserving the input/output behavior of the design. Moreover, although the registers can be moved across hierarchical boundaries during retiming, the design hierarchy is typically preserved. However, unlike other sequential optimization techniques (such as finite state machine (FSM) re-encoding/optimization, register merging/replication, etc.) which are local transformations, retiming is a global transformation that can be applied to a region of any size within a design. Consequently, it is generally difficult to verify retimed designs using conventional sequential verification techniques.

There are several proposed techniques for performing retiming verification. One such technique demonstrates that retiming can be verified by temporal equivalence which checks the number of registers on the corresponding cycles of two designs (see N. Shenoy, et al., *On the temporal equivalence of sequential circuits*, Proceedings of the Design Automation Conference, pp. 405-409, 1992, "Shenoy" hereafter). Another proposed technique verifies circuits which are both retimed and combinationally optimized by transforming a sequential equivalence problem into a combinational equivalence problem with the notion of a timed Boolean function that is represented with input values in multiple finite clock cycles (see R. K. Ranjan, et al., "*Using combinational verification for sequential circuits*," in Proceedings of the Conference on Design Automation and Test in Europe, pages 9-12, 1999). Yet another proposed technique verifies retiming and combinational optimizations by recognizing retiming invariants as relationships between the registers of the two designs and checks the equivalence from the given initial states of the registers (see M. Mneimneh and K. Sakallah, *Reverse: Efficient sequential verification for retiming*, International Workshop on Logic Synthesis, 2003). However, all of these retiming verification techniques are restricted to designs that are either purely retimed without either sequential or combinational optimizations, or retimed with only combinational optimizations. Unfortunately, there is no known technique that can effectively verify designs that are both globally retimed and sequentially optimized through local transformations.

Hence, what is needed is a technique for performing sequential verifications on designs which are both globally retimed and sequentially optimized locally.

SUMMARY

One embodiment of the present invention provides a system that performs sequential equivalence checking between integrated circuit (IC) designs. During operation, the system receives a first IC design and a second IC design. Each of the first and second IC designs includes a top design level and a bottom design level, and the bottom design levels include one or more sub-blocks within the corresponding top design levels. The system then verifies if each of the sub-blocks in the bottom design level of the first design is conditionally equivalent to a corresponding sub-block in the bottom design level of the second design. Note that two designs are conditionally equivalent if the two designs can become sequentially equivalent by adding registers on the input and output ports of the two designs. The system additionally verifies if the top design level of the first design is conditionally equivalent to the top design level of the second design and if the first design is temporally equivalent to the second design. If the preceding verifications are true, the system determines that the first design and the second design are sequentially equivalent.

In a variation on this embodiment, the system verifies if a sub-block A in the first design is conditionally equivalent to a corresponding sub-block A' in the second design by first identifying a set of input ports and a set of output ports for each of the two sub-blocks A and A'. The system then identifies a set of paths between the set of input ports and the set of output ports, wherein each path is an internal path from an input port to an output port within a corresponding sub-block. Next, the system generates a set of equations for the set of paths, wherein the set of equations provide a set of conditions for the sub-blocks A and A' to be temporally equivalent. The system then attempts to solve jointly the set of equations formulated for the set of paths to find a solution. If a solution is found, the system determines that the sub-blocks A and A' can be conditionally equivalent. If no solution is found, the system determines that the sub-blocks A and A' cannot be conditionally equivalent.

In a further variation on this embodiment, the sub-block A in the first design can include a sub-block in the bottom design level of the first design and the top design level of the first design. Separately, the sub-block A' in the second design can include a sub-block in the bottom design level of the second design and the top design level of the second design.

In a further variation, while identifying a set of paths between the set of input ports and the set of output ports, the system chooses a path containing the least number of registers if more than one path is found between a given input port and a given output port.

In a further variation, the system generates the set of equations for the set of paths by: for each path from an input port x to an output port y, formulating an equation: $A_{xy} - A'_{xy} = (A'_x + A'_y) - (A_x + A_y)$, wherein $A_{xy}$ and $A'_{xy}$ denote the number of registers on the path of the respective design blocks A and A'; $A_x$ and $A_y$ denote the number registers to be added on port x and port y of the design block A, respectively; and $A'_x$ and $A'_y$ denote the number registers to be added on port x and port y of the design block A', respectively.

In a further variation, the system solves jointly the set of equations formulated for the set of paths by attempting a solution for the set of values $A_x$, $A_y$, $A'_x$ and $A'_y$ for the set of input ports and the set of output ports.

In a further variation, the system solves the set of equations using an integer linear programming (ILP) technique.

In a further variation, the system chooses a solution which minimizes the total number of registers added to the set of input ports and the set of output ports if more than one solution is found for the set of equations.

In a further variation, the system verifies if a sub-block A in the first design is conditionally equivalent to a corresponding sub-block A' in the second design further by checking if the two sub-blocks are temporally equivalent. If so, the system verifies if the two sub-blocks are sequentially equivalent.

In a further variation, if the sub-blocks A and A' are not temporally equivalent, the system then modifies the sub-blocks A and A' to make the two sub-blocks temporally equivalent by adding registers to the associated ports. Next, the system verifies if the two modified sub-blocks are sequentially equivalent.

In a further variation, the system performs sequential equivalence checking by using a weak alignability technique to perform the sequential equivalence checking.

In a variation on this embodiment, the system verifies if the top design level of the first design is conditionally equivalent to the top design level of the second design by first creating a top-level block from the top design level. This further involves black-boxing the sub-blocks of the respective bottom design level. The system then verifies if the top-level block of the first design is conditionally equivalent to the top-level block of the second design.

In a variation on this embodiment, the system verifies if the first design is temporally equivalent to the second design by first identifying a set of fundamental cycles of the first design and a set of corresponding fundamental cycles of the second design. Next, for each fundamental cycle of the first design and each corresponding fundamental cycle of the second design, the system verifies if the two corresponding fundamental cycles have the same number of registers. If so, the system determines that the first design and the second design are temporally equivalent.

In a variation on this embodiment, the method is used to perform sequential equivalence checking on designs which are both globally retimed and locally sequentially optimized.

In a variation on this embodiment, the system receives a third design and a fourth design, wherein each of the third and fourth designs includes multiple corresponding design levels. The system then identifies two adjacent design levels of the third design and corresponding two adjacent design levels of the fourth design from the multiple corresponding design levels. Next, the system verifies if: (1) each of the two adjacent design levels of the third design is conditionally equivalent to each of the corresponding two adjacent design levels of the fourth design; and (2) the higher level of the two adjacent design levels of the third design is temporally equivalent to the higher level of the corresponding two adjacent design levels of the fourth design. If so, the system moves up one design level and creates the next two adjacent design levels within the multiple design levels. The system then repeats the preceding verifications for the next two adjacent design levels between the third and fourth designs. Hence, the system can recursively perform sequential equivalence checking in a bottom-up manner through the multiple design levels of the third and fourth designs.

BRIEF DESCRIPTION OF THE FIGURES

FIG. 12 illustrates a non-transitory computer readable storage medium in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a technique for verifying large designs which are not only retimed but also sequentially and/or combinationally optimized. More specifically, a new notion of "conditional equivalence" is proposed. During retiming verification, the proposed technique performs a hierarchical verification by checking whether each pair of sub-blocks of two corresponding designs is conditionally equivalent. Even if two design blocks are not sequentially equivalent due to retiming, necessary conditions for the two blocks to be sequentially equivalent can be computed, and the two design blocks can be modified according to the necessary conditions. If the two modified design blocks are sequentially equivalent, the original design blocks are considered as conditionally equivalent. Next, these necessary conditions are verified on the associated parent design blocks through temporal equivalence checking. The proposed technique can be used to perform hierarchical sequential equivalence checking on large IC designs which cannot be verified by using conventional sequential equivalence checking techniques.

Figure 1:
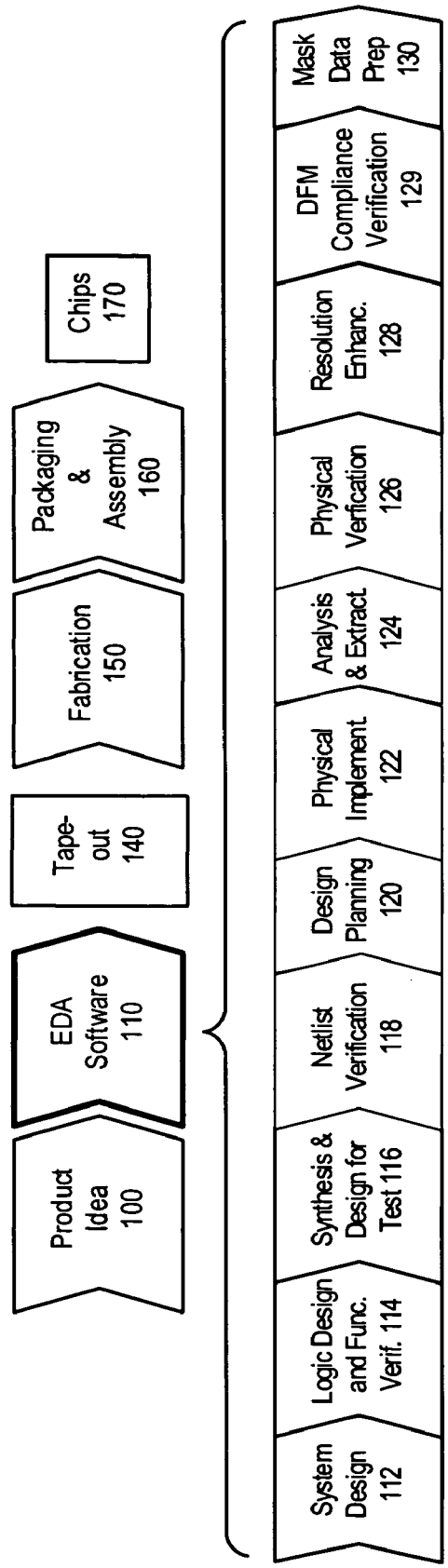
FIG. 1 illustrates various stages in the design and fabrication of an integrated circuit.

FIG. 1 illustrates various stages in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPLIER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this in turn permits what-if refinement. Exemplary EDA software products from SYNOPSYS, INC. that can be used at this stage include ASTRORAIL®, PRIMERAIL®, PRIMETIME®, and STAR RC/XT® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGED® products.

DFM compliance verification (stage 129): In this stage, the design (mask layout) is checked to ensure correctness for manufacturing, electrical issues, mechanical stress issues, lithographic issues, and circuitry. Exemplary EDA software products from SYNOPSYS, INC. that can be used at this stage include the PRIME YIELD®, SIVL®, SEISMOS® products.

Mask data preparation (stage 130): This stage provides the "tape-out" data for production of masks to produce finished chips. Exemplary EDA software products from SYNOPSYS, INC. that can be used at this stage include the CATS® family of products.

Embodiments of the present invention can be used during one or more of the above-described stages. Specifically, one embodiment of the present invention can be used during logic design and functional verification stage 114, netlist verification stage 118, design planning stage 120, and physical implementation stage 122.

Terminologies
Weak Alignability

The original alignability computation proposed by Pixley includes two steps: (1) computing "equivalent state pairs" (ESP) and (2) computing "alignable state pairs" (ASP), wherein ESP is a set of state pairs from which two designs behave exactly the same over time, and ASP is a set of state pairs that can reach a state in ESP from any arbitrary power up state. Two designs are said to be "alignable" if and only if the associated ASP is tautological. Note that the original alignability is not compositional.

Weak alignability, on the other hand, is a compositional extension on the original alignability, which can handle large designs. More specifically, this technique computes only ESP and uses non-empty ESP as a notion of sequential equivalence by assuming that the designs are weakly synchronizable (see I. Pomeranz and S. Reddy, "*On removing redundancies from synchronous sequential circuits with synchronizing sequences*," in IEEE Transactions on Computers, pages 20-32, 1996). This means that there exists an input sequence which can take any arbitrary power up state to a subset of the states in the ESP. Note that this non-empty ESP is compositional. For two designs comprising sub-blocks, if each sub-block has non-empty ESP, the two designs are sequentially equivalent.

Note that although the weak alignability technique in conjunction with sequential equivalence checking can be used to verify fairly large designs, this technique does not work well on designs that include both global retiming and sequential optimizations. This is because some sub-blocks involved in the retiming are no longer sequentially equivalent even though the designs are equivalent.

Temporal Equivalence

Figure 2A:
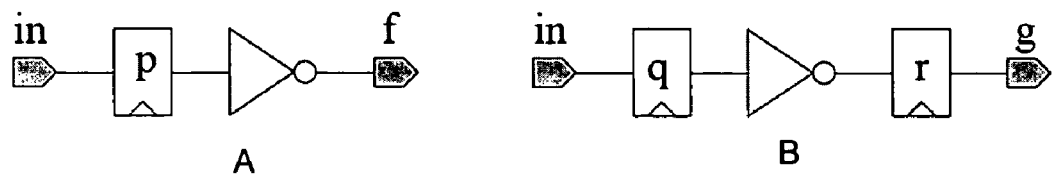
FIG. 2A illustrates an example of two circuits A and B which are logically equivalent, but temporally not equivalent.

Temporal equivalence checking for two sequential circuits involves checking the input/output behavior of the sequential circuits with respect to time while assuming the logical equivalence of the two circuits (see Shenoy). For example, FIG. 2A illustrates an example of two circuits A and B which are logically equivalent, but temporally not equivalent. Note that the two circuits A and B are not temporally equivalent because $f(t)=g(t+1)$, wherein f and g are the outputs of A and B, and t is current time.

Figure 2B:
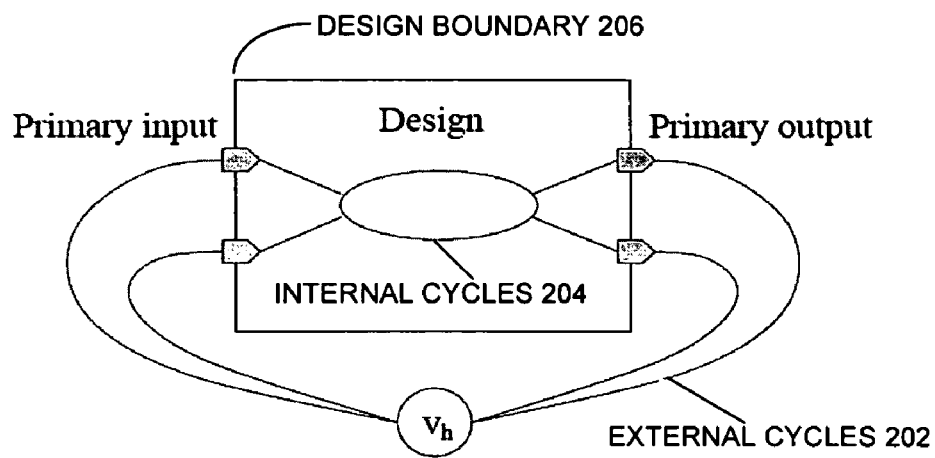
FIG. 2B illustrates a model for temporal equivalence checking by defining the host vertex $v_h$ as the environment.

More specifically, temporal equivalence is checked by testing whether the numbers of registers in all cycles of the designs are preserved. Although the number of cycles in a design can be prohibitively large, it is sufficient to check only on "fundamental cycles," which are a set of linearly independent cycles that can represent all cycles in the design. FIG. 2B illustrates a model for temporal equivalence checking by defining the host vertex $v_h$ as the environment. Note that there are two types of fundamental cycles with this model: external cycles 202, which are the ones passing through $v_h$, and internal cycles 204, which are the ones internal to design boundary 206. Hence, temporal equivalence checking is performed by testing whether the numbers of registers in all the fundamental cycles of a design are preserved.

Note that during a retiming process, because retiming just moves registers over the logic gates without changing the sequential behavior of the original circuit, the logical equivalence is preserved. Thus, temporal equivalence can be used to check whether the retiming is valid. Hence, the terms "temporal equivalence" and "retiming invariant" are used interchangeably in this disclosure.

Note that above-described temporal equivalence checking is very fast and scalable because it requires only structural traversing of the designs. However, this technique is typically not applicable to designs that are sequentially optimized. This is due to the fact that the mapping of internal cycles is not guaranteed since sequential optimizations often change internal cycles of the designs. Nevertheless, note that the external cycles remain unchanged throughout a sequential optimization. Consequently, the temporal equivalence checking on the external cycles can be used as a necessary condition for sequential equivalence of the designs.

Conditional Equivalence

We assume that all sequential elements within a design (such as flip-flops, latches, etc.) can be normalized into a common type of sequential element, so that only one type of sequential element in the design needs to be verified during sequential verification. We refer to this common type of sequential element as "registers" throughout. Note that a register can have an asynchronous reset.

DEFINITION 1: Two Designs are Conditionally Equivalent if and Only if the Two Designs can be Sequentially Equivalent by Adding Registers on the Boundaries of the Two Designs.

Figure 3:
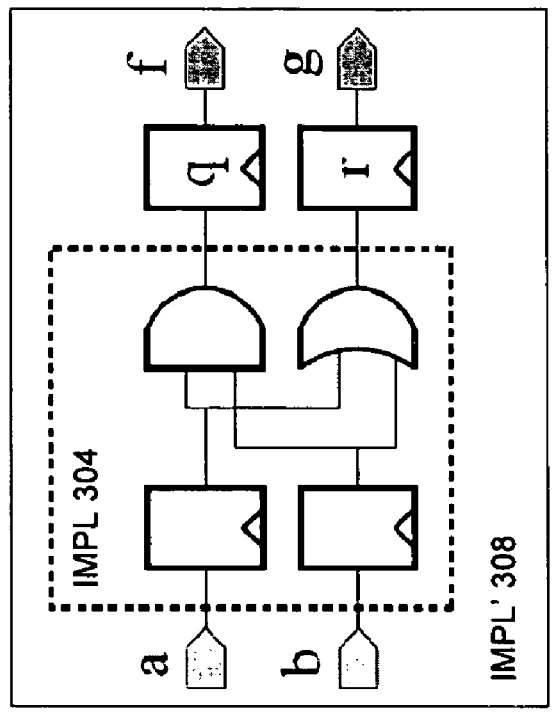
FIG. 3 illustrates an example of conditional equivalence between a design "Spec" and a design "Impl" in accordance with an embodiment of the present invention.
Figure 3:
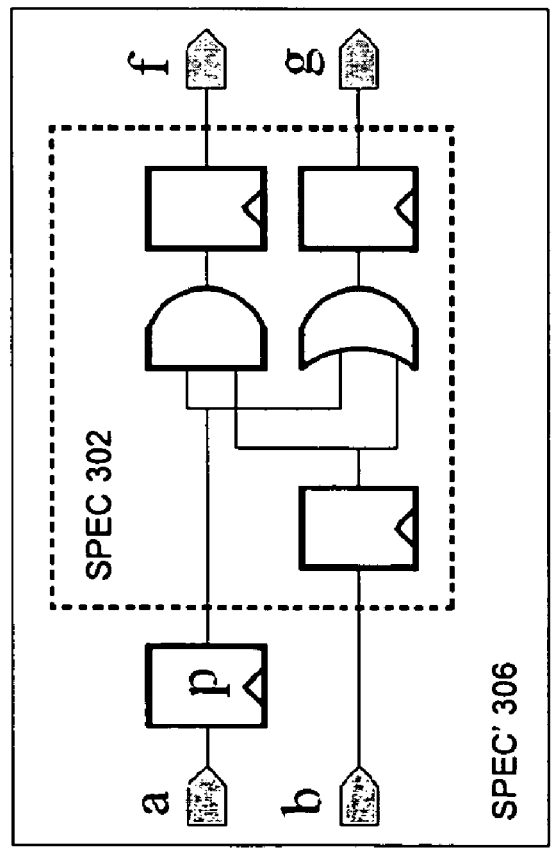

FIG. 3 illustrates an example of conditional equivalence between a design "Spec" 302 and a design "Impl" 304 in accordance with an embodiment of the present invention. Note that in FIG. 3, the two designs Spec 302 and Impl 304 inside the respective dashed boxes are not sequentially equivalent. However, when we add extra register p on port a in Spec 302 and registers q and r on ports f and g in Impl 304, the two modified designs Spec' 306 and Impl' 308 become sequentially equivalent (i.e., they have same number of registers on all corresponding paths). Consequently, the original two designs Spec 302 and Impl 304 are considered as "conditionally equivalent."

We describe the process of computing the number of registers to add in order to make two designs conditionally equivalent below. Note that if two designs cannot be made conditionally equivalent by adding registers, the two designs cannot be sequentially equivalent because the temporal equivalence is not preserved.

Performing Compositional Equivalence Verification

We now describe a process for checking sequential equivalence of two designs or two blocks by incorporating the concept of "conditional equivalence." Note that the terms "design" and "block" herein are used interchangeably, and should be broadly interpreted as a design block within a design boundary at any level within a design hierarchy. For example, a design or a block can be a sub-block in the bottom level of a two-level design, or a top-level block enclosing one or more sub-blocks from the bottom level of the two-level design.

Checking Conditional Equivalence

Figure 4:
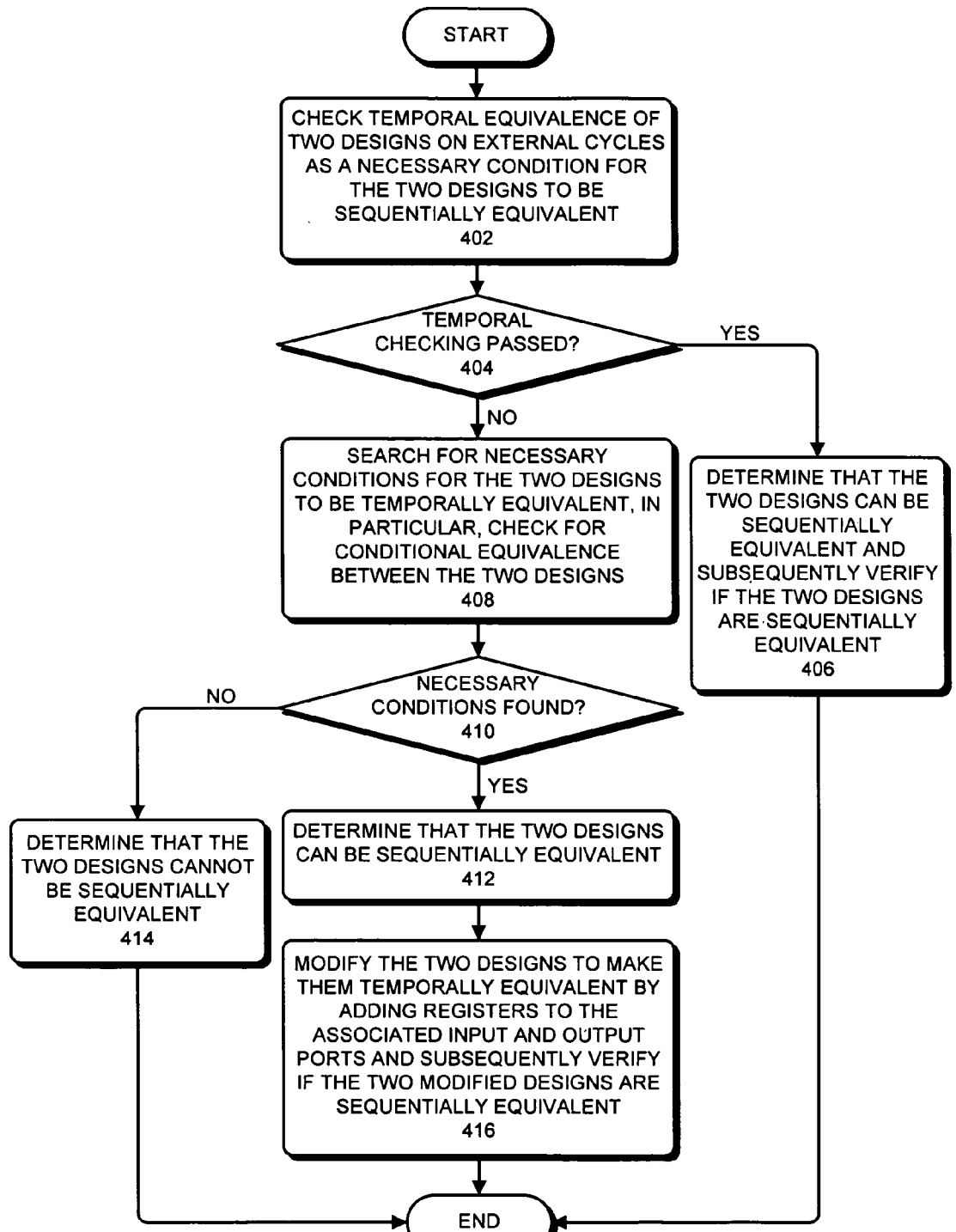
FIG. 4 presents a flowchart illustrating a process for checking if two designs can be sequentially equivalent in accordance with an embodiment of the present invention.

FIG. 4 presents a flowchart illustrating a process for checking if two designs are sequentially equivalent in accordance with an embodiment of the present invention.

During operation, the system first checks temporal equivalence of the two designs on external cycles as a necessary condition for the two designs to be sequentially equivalent (step 402), and then determines if the checks verify the sequential equivalence (step 404). If so, the system determines that the two designs can be sequentially equivalent and subsequently verifies if the two designs are sequentially equivalent (step 406). In one embodiment, the system can use the aforementioned weak alignability technique to perform sequential equivalence checking on the two designs. An example of a weak alignability technique is described in I.-H. Moon, P. Bjesse, and C. Pixley, *A compositional approach to the combination of combinational and sequential equivalence checking of circuits without known reset states*, Proceedings of the Design, Automation and Test in Europe Conference, pp. 1170-1175, 2007 ("Moon" hereafter). In other embodiments, the system can use other conventional sequential equivalence checking techniques on the two designs.

If the above checking process fails, the system searches for the necessary conditions to satisfy temporal equivalence. In particular, the system can check for conditional equivalence between the two designs, which indicates that the two designs can become sequentially equivalent by adding registers on the design boundaries (step 408). The system then determines if the necessary conditions are found to satisfy the temporal equivalence (step 410). If so, the system determines that the two designs can be sequentially equivalent by adding registers on the design boundaries (step 412). Otherwise, the system determines that the two designs cannot be sequentially equivalent (step 414). If the two designs can be sequentially equivalent, the system modifies the two designs to make them temporally equivalent by adding registers to the associated input and output ports (which is described in more detail below), and subsequently verifies if the two modified designs are sequentially equivalent (step 416).

Figure 5:
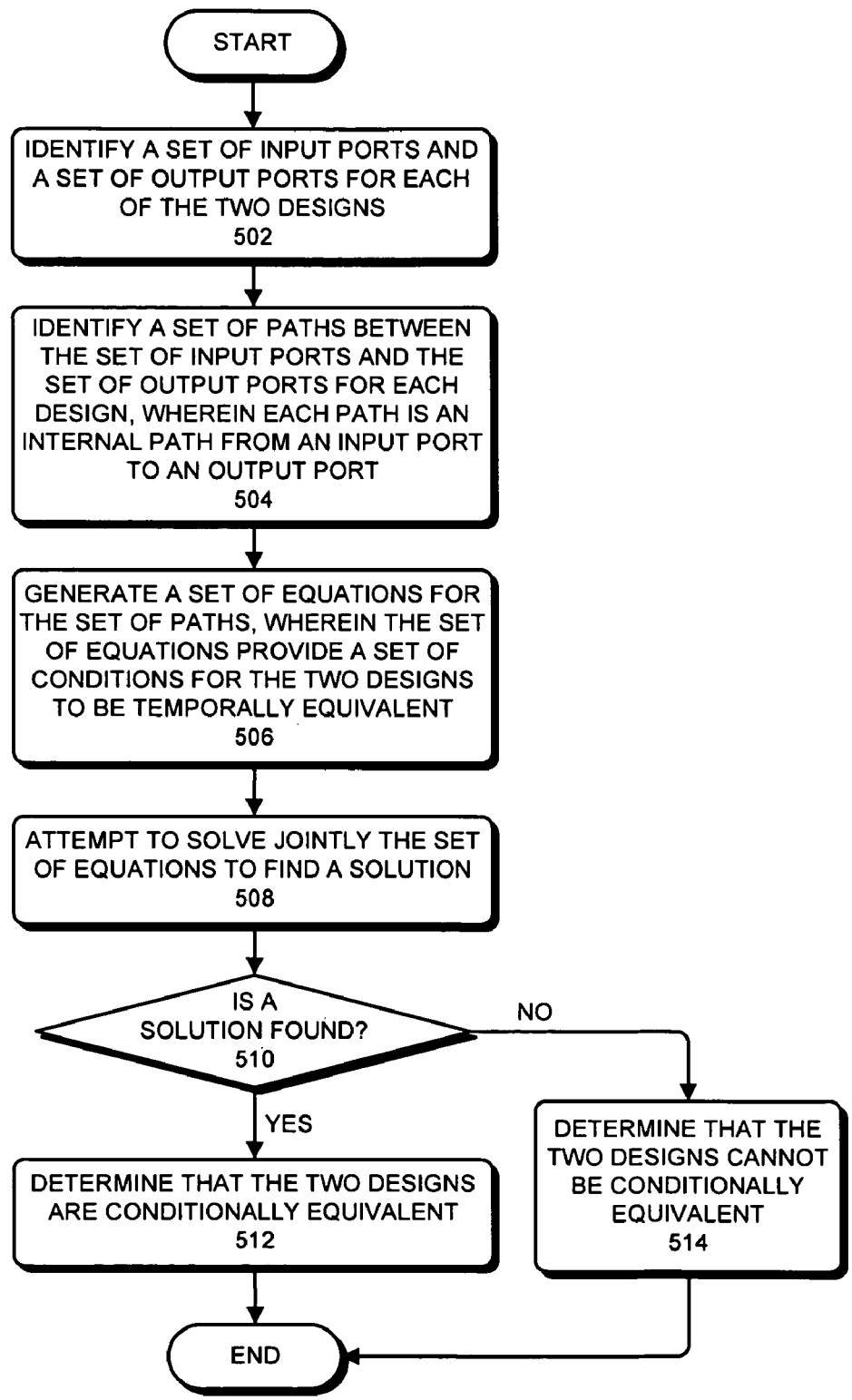
FIG. 5 presents a flowchart illustrating a process for checking if two designs can be conditionally equivalent in accordance with an embodiment of the present invention.

FIG. 5 presents a flowchart illustrating a process for checking if two designs can be conditionally equivalent in accordance with an embodiment of the present invention.

Figure 6:
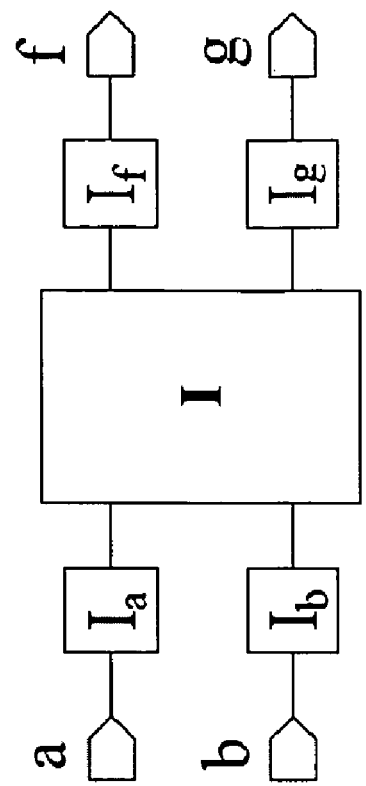
FIG. 6 illustrates two exemplary designs S and I in accordance with an embodiment of the present invention.
Figure 6:
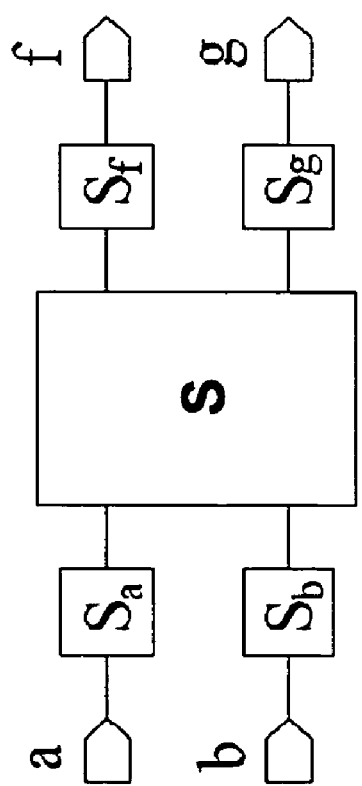

During operation, the system identifies a set of input ports and a set of output ports for each of the two designs S and I (step 502). Referring to FIG. 6, which illustrates two exemplary designs S and I in accordance with an embodiment of the present invention, note that the two designs have two corresponding input ports a and b, and two corresponding output ports f and g.

The system then identifies a set of paths between the set of input ports and the set of output ports for each design, wherein each path is an internal path from an input port to an output port within a corresponding design (step 504). For example, designs S and I in FIG. 6 can each have four paths: a→f, a→g, b→f, and b→g. As seen in FIG. 6, there can be different paths that link port a to port g. In some embodiments of the present invention, if more than one path is found between a given input port and a given output port, the system can choose a path which contains the least number of registers along the path. Because only one path needs to be identified for an input port and an output port, one can simply represent a path from an input port x to an output port y as a path xy.

Next, the system generates a set of equations for the set of paths, wherein the set of equations provide a set of conditions for the two designs to be temporally equivalent (step 506). We now describe how to set up the equations for designs S and I in FIG. 6. Note that the above problem can be formulated as an integer linear programming (ILP) problem.

For simplicity, assume that there are only simple registers without reset in the two designs S and I. Let $S_p$ and $I_p$ be the number of registers to add on a port p in designs S and I, respectively. Also, let $S_{xy}$ and $I_{xy}$ be the number of registers on a path xy in designs S and I, respectively. Now, let $D_{xy}$ be the difference in the number of registers on the path xy between designs S and I. Hence, $D_{xy}$ can be expressed as:

$$S_{xy} - I_{xy} = D_{xy}. \quad (1)$$

Note that to satisfy temporal equivalence on a fundamental cycle xy, the difference in the total number of registers added to both port x and port y between designs S and I should be $-D_{xy}$, therefore:

$$(S_x + S_y) - (I_x + I_y) = -D_{xy}. \quad (2)$$

The system then generates a set of equations in the form of ILP formulated for all paths from each input to each output (but typically excluding clock input). For example, in FIG. 6, the set of equations are:

$$(S_a + S_f) - (I_a + I_f) = -D_{af}$$

$$(S_a + S_g) - (I_a + I_g) = -D_{ag}$$

$$(S_b + S_f) - (I_b + I_f) = -D_{bf}$$

$$(S_b + S_g) - (I_b + I_g) = -D_{bg}$$

Note that the D values on the right hand side of the equations are constant values.

Now, we can extend this ILP formulation to handle registers with asynchronous reset. In this case, we need to compute the numbers of two types of registers to be added on each port: one for those registers with reset and the other one for those registers without reset. The condition for the registers with reset is that each corresponding port in designs S and I has the same number of registers with reset. This is decided before the number of registers without reset. Additionally, reset input is excluded in the ILP formulation in Equation 2. (In most designs, both clock and reset signals can be automatically found by looking at the structural supports of the registers in the design. Otherwise, the system can ask the user to specify the signals). However, we consider only registers without reset hereafter without loss of generality.

Referring back to FIG. 5, after generating the set of equations for the set of paths to satisfy temporal equivalence, the system then attempts to solve jointly the set of equations to find a solution (step 508). More specifically, the system attempts to find a solution for all sets of variables $S_p$ and $I_p$ on all input ports and output ports of the two designs S and I. In some embodiments of the present invention, if more than one solution is found for the set of equations, the system chooses a solution which minimizes the total number of registers added to the set of input ports and the set of output ports.

Next, the system determines if a solution is found (step 510). If so, the system determines that the two designs S and I are conditionally equivalent (step 512). Otherwise, if there is no solution from the set of equations, the system determines the two designs cannot be conditionally equivalent because the necessary conditions cannot be satisfied (step 514).

Note that if designs S and I are conditionally equivalent, the system generates two modified designs S' and I' which are temporally equivalent with the added registers. Next, the system can perform sequential equivalence checking on the two modified designs S' and I' with the added registers. In one embodiment, the system can use the aforementioned weak alignability technique to perform sequential equivalence checking on the two modified designs. In other embodiments, the system can use other conventional sequential equivalent checking techniques on the two modified designs.

Retime Offset

In some embodiments of the present invention, if a solution is found in the above ILP formulation to make the two designs S and I conditionally equivalent, the number of registers computed for both designs can be combined into either of the two designs using a "retime offset" representation.

DEFINITION 2: Retime Offset is a Number of Registers to Add on Each Port Against its Corresponding Port for Two Designs to be Equivalent.

Figure 7:
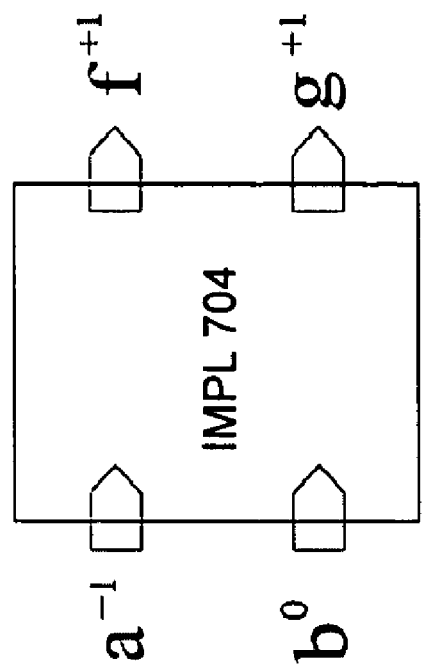
FIG. 7 illustrates a conditional equivalence with retime offset representation for the two exemplary designs in FIG. 3.
Figure 7:
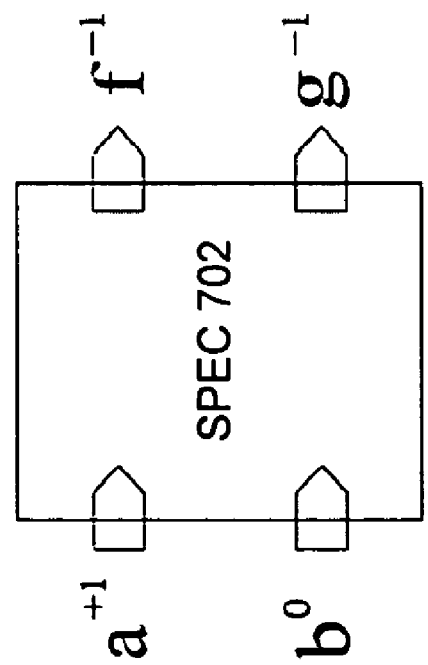

For example, a retime offset on a given port p can be represented as $p^k$ wherein k is the number of registers to add, which can take on both positive and negative values. A negative k on design S indicates that conditional equivalence requires |k| registers to be added on the corresponding port of the design I. FIG. 7 illustrates a conditional equivalence with a retime offset representation for the two exemplary designs in FIG. 3. Note that the retime offset value on an input or an output port in Spec 702 is the negation of the retime offset value on a corresponding port in Impl 704.

Conditions for Sequential Equivalence

The following theorem can be shown:

THEOREM: Two Designs are Sequentially Equivalent if and Only if all Sub-Blocks are Conditionally Equivalent and the Two Designs Preserve the Temporal Equivalence.

Figure 8A:
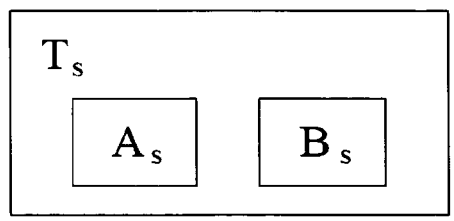
FIG. 8A illustrates a two-level design S and a two-level design I in accordance with an embodiment of the present invention.
Figure 8A:
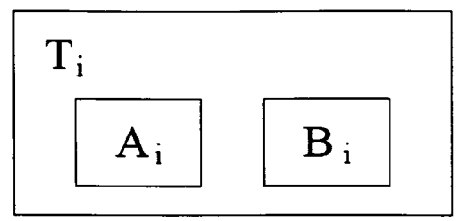

FIG. 8A illustrates a two-level design S and a two-level design I in accordance with an embodiment of the present invention. More specifically, the bottom level of each design comprises two design blocks A and B, wherein the subscripts denote whether a block belongs to design S or design I. Moreover, the top level of each design comprises a design block T (i.e., $T_s$ or $T_i$), which is obtained by "black-boxing" the corresponding bottom level blocks A and B. Note that black-boxing a lower level block in a design herein means making an input pin of the lower level block into a design output port and an output pin of the lower level block into a design input port, and ignoring the internal structure of the lower level block.

Hence, design S comprises a set of sub-blocks ($A_s$, $B_s$, and $T_s$) while design I comprises a set of sub-blocks ($A_i$, $B_i$, and $T_i$). The theorem indicates that design S and design I are sequentially equivalent if and only if all sub-block pairs ($A_s$, $A_i$), ($B_s$, $B_i$) and ($T_s$, $T_i$) are conditionally equivalent, and the two designs preserve the temporal equivalence.

Figure 8B:
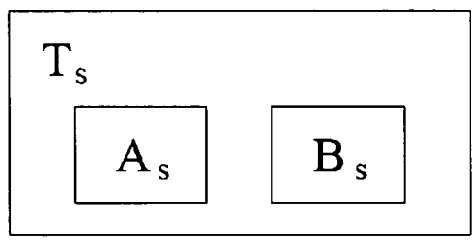
FIG. 8B illustrates a modified design I represented by the sub-blocks of design S associated with the retime offsets shown as the circles in accordance with an embodiment of the present invention.
Figure 8B:
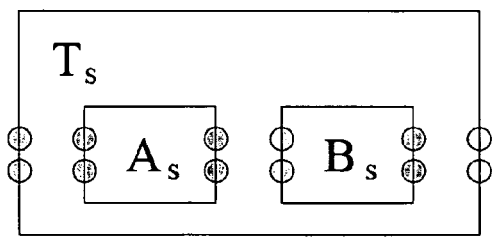

Recall that that if all sub-blocks (A, B, and T) are conditionally equivalent, the sub-blocks ($A_i$, $B_i$, and $T_i$) in design I can be replaced by the respective sub-blocks ($A_s$, $B_s$, and $T_s$) in design S based on the appropriate retime offset representation. FIG. 8B illustrates a modified design I represented by the sub-blocks of design S associated with the retime offsets shown as the circles in accordance with an embodiment of the present invention.

One important implication of the above theorem is that once all sub-blocks of the two designs are conditionally equivalent, the remaining problem of verifying sequential equivalence becomes a pure temporal equivalence verification (i.e., retiming verification) problem, which can be handled by existing techniques. Consequently, the above theorem enables a compositional retiming verification of designs which are also sequentially optimized. We now describe a technique for performing the temporal equivalence verification after all sub-blocks of the designs have been verified to be conditionally equivalent.

Performing Temporal Equivalence Verification

In one embodiment of the present invention, temporal equivalence verification can be done by checking temporal equivalence based on Shoney. One technique for checking temporal equivalence involves first identifying fundamental cycles in the designs and matching all corresponding fundamental cycles between the two designs, and then checking whether each corresponding fundamental cycle has the same number of registers. In one embodiment of the present invention, the temporal equivalence checking process can be simplified based on the retime offset representation introduced above.

Figure 9:
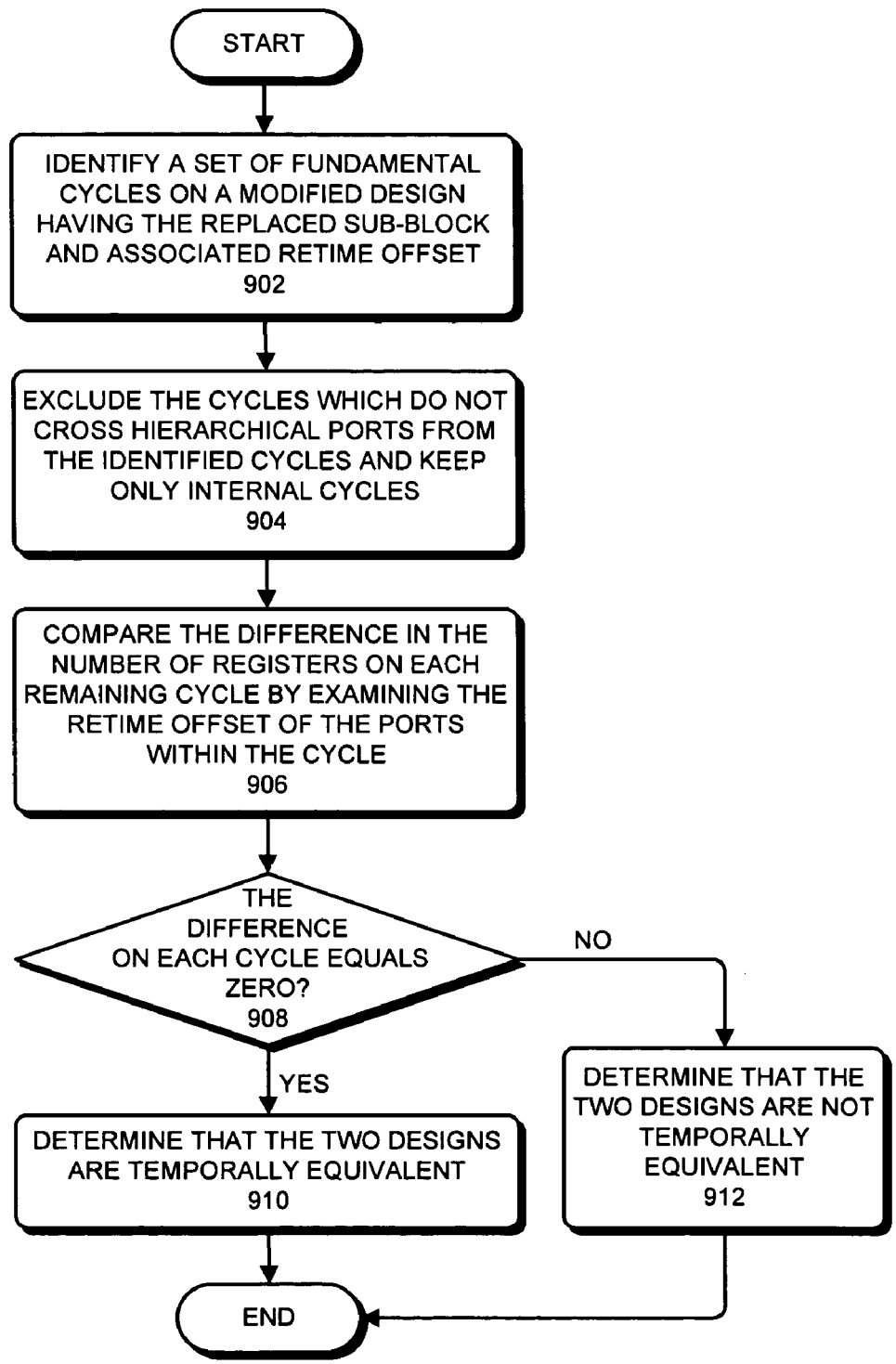
FIG. 9 presents a flowchart illustrating a process for performing temporal equivalence verification in accordance with an embodiment of the present invention.

More specifically, FIG. 9 presents a flowchart illustrating a process for performing temporal equivalence verification in accordance with an embodiment of the present invention. During operation, the system first identifies a set of fundamental cycles on a modified design having the replaced sub-block and associated retime offset (step 902). For example in FIG. 8B, the system can choose the modified design I.

Next, the system excludes the cycles which do not cross hierarchical ports from the identified cycles and keeps only internal cycles (step 904). Note that this simplification is based on the fact that the external cycles are already used as a necessary condition for temporal equivalence as described in conjunction with FIG. 4.

The system then compares the difference in the number of registers on each remaining cycle by examining the retime offset of the ports within the cycle (step 906). Note that the system does not count the actual number of registers in this step. Also note that the number of registers on the corresponding cycle in the other design (e.g., design S in FIG. 8B) can be obtained by ignoring the retime offset on the cycle in the chosen design (i.e., modified design I in FIG. 8B). Instead, the system determines if the difference in the number of registers on each cycle equals zero (step 908). If so, the system determines that the two designs are temporally equivalent (step 910). Otherwise, the system determines that the two designs are not temporally equivalent (step 912).

Figure 10:
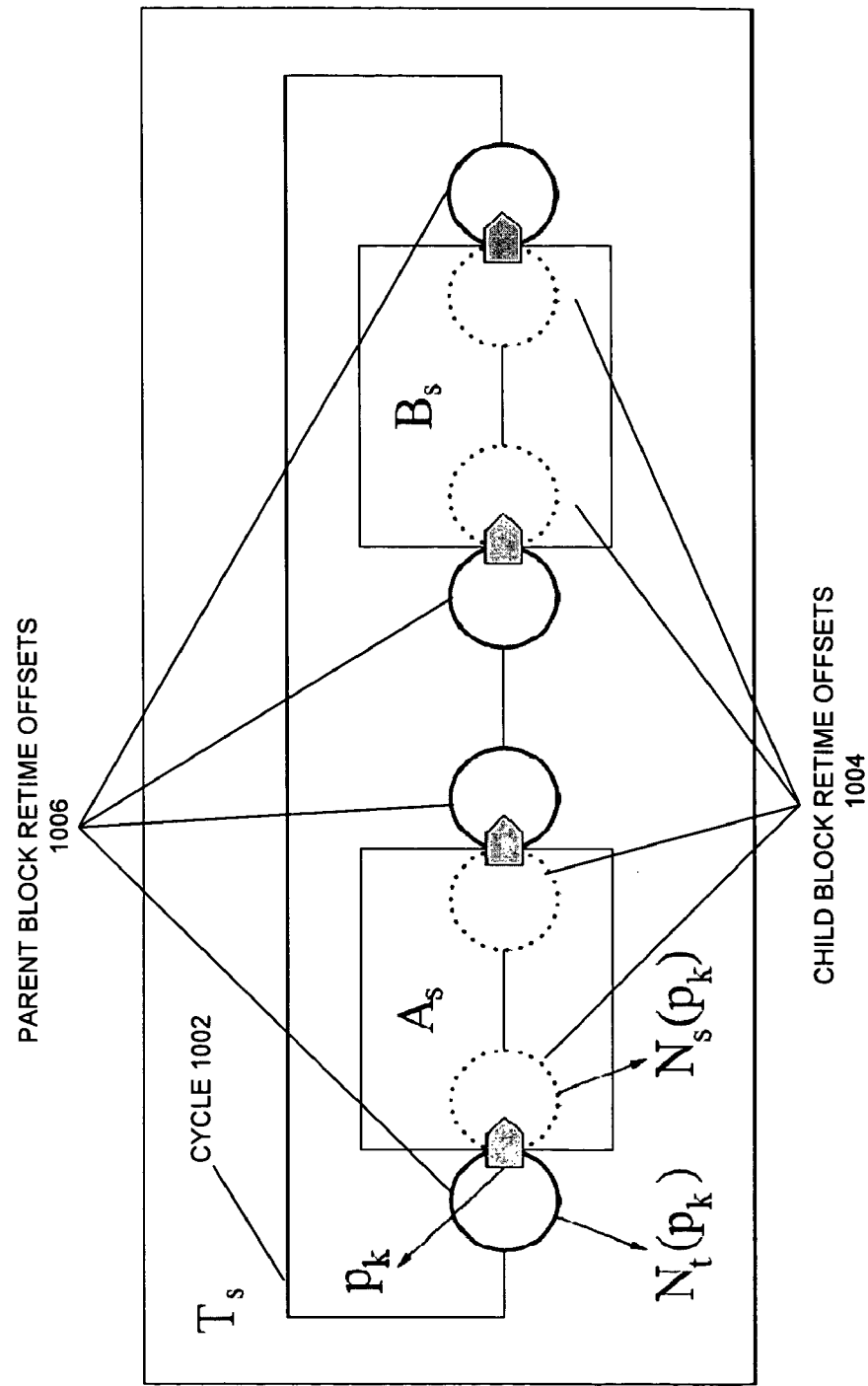
FIG. 10 illustrates how to check temporal equivalence on a fundamental cycle in accordance with an embodiment of the present invention.

FIG. 10 illustrates how to check temporal equivalence on a fundamental cycle 1002 (within modified design I of FIG. 8B) in accordance with an embodiment of the present invention. Note that there are two types of retime offset in FIG. 10. The dotted circles 1004 represent the retime offset on the ports of child blocks. Note that this retime offset is the number of registers to add for the child blocks (A, B) to be conditionally equivalent. Separately, the solid circles 1006 represent the retime offset on the pins of the parent block instances (after black-boxing the child block). Note that this retime offset is the number of registers to add for the parent block (T) to be conditionally equivalent.

Now, if we assume that the $i^{th}$ fundamental cycle crosses $m_i$ instance pins ($m_i=4$, in this example) and let $\delta_i$ be the difference in the number of registers in the $i^{th}$ cycle, we can then formulate $\delta_i$ as:

$$\delta_i = \sum_{k=0}^{m_i-1} [N_t(p_k) + N_s(p_k)], \qquad (3)$$

-continued $$\forall_i \ (\delta_i = 0), \quad (4)$$

where $p_k$ is the $k^{th}$ instance pin in the $i^{th}$ cycle, $N_t(p_k)$ is the retime offset on the instance pin ($p_k$) from the top block $T_s$, and $N_s(p_i)$ is the retime offset on the port ($p_k$) of the child block. Consequently, the temporal equivalence checking on the set of fundamental cycles is essentially performed by Equation 4 because all cycles should have no difference (i.e., $\delta_i=0$ for all fundamental cycles) in the number of registers.

Processing for Performing Sequential Equivalence Verification

Figure 11:
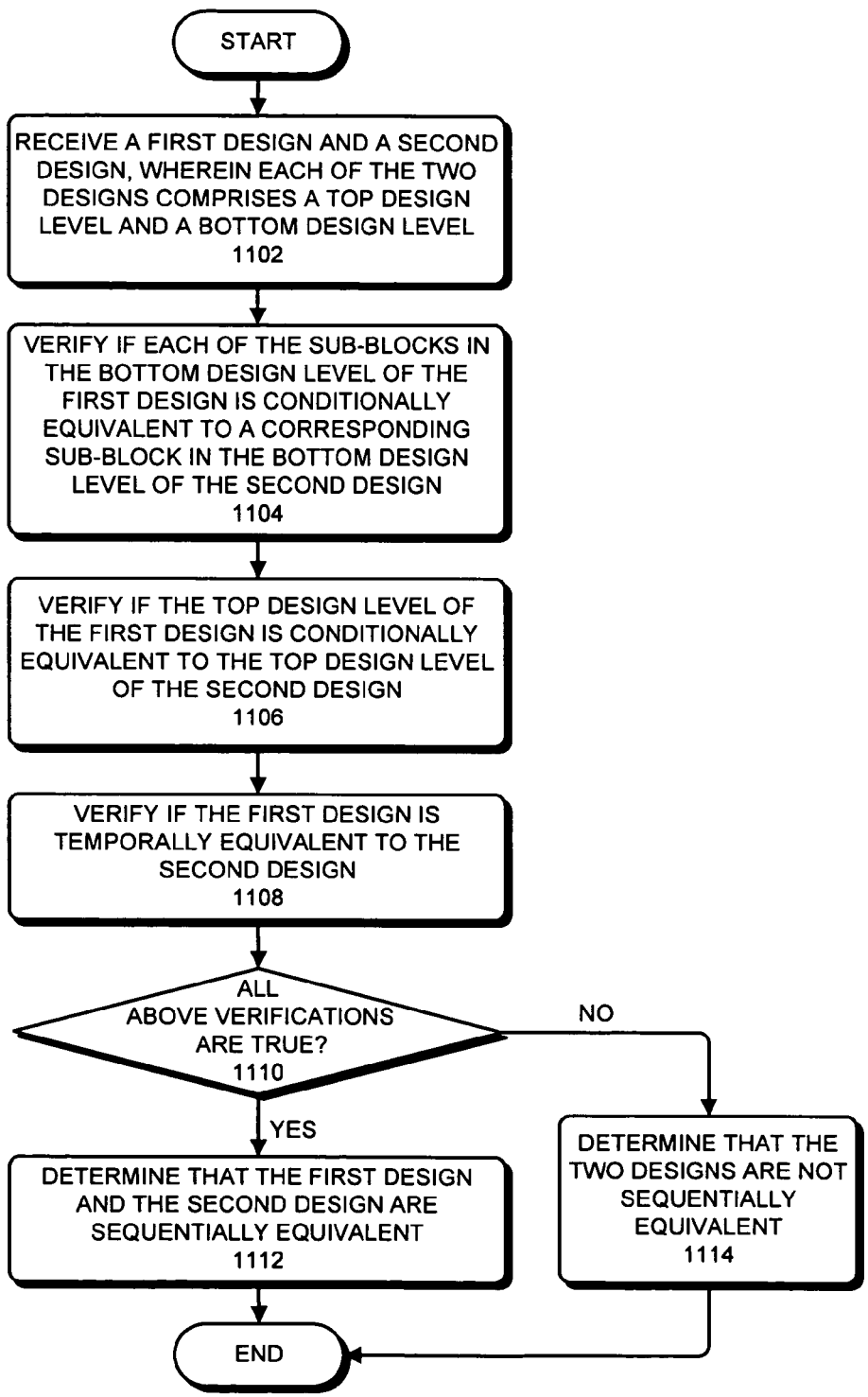
FIG. 11 presents a flowchart illustrating a process for performing sequential equivalence checking between two IC designs in accordance with an embodiment of the present invention.

FIG. 11 presents a flowchart illustrating a process for performing sequential equivalence checking between two IC designs in accordance with an embodiment of the present invention.

During operation, the system starts by receiving a first IC design and a second IC design, wherein each of the two designs comprises a top design level and a bottom design level, and each of the bottom design levels comprises one or more sub-blocks within the corresponding top design levels (step 1102).

The system then verifies if each of the sub-blocks in the bottom design level of the first design is conditionally equivalent to a corresponding sub-block in the bottom design level of the second design (step 1104). In one embodiment of the present invention, if two sub-blocks are determined to be conditionally equivalent, the system subsequently modifies the two sub-blocks to make them temporally equivalent by adding registers to the associated input and output ports. The system then verifies if the two modified sub-blocks are sequentially equivalent.

The system additionally verifies if the top design level of the first design is conditionally equivalent to the top design level of the second design (step 1106). More specifically, verifying if the top design levels are conditionally equivalent involves first creating a top-level block from the top design level by black-boxing the sub-blocks of the respective bottom design level, and then verifying if the top-level block of the first design is conditionally equivalent to the top-level block of the second design. In one embodiment of the present invention, if two top-level blocks are determined to be conditionally equivalent, the system subsequently modifies the two top-level blocks to make them temporally equivalent by adding registers to the associated input and output ports. The system then verifies if the two modified top-level blocks are sequentially equivalent.

Next, the system verifies if the first design is temporally equivalent to the second design (step 1108). In one embodiment of the present invention, the system performs the temporal equivalence checking by: (1) identifying a set of fundamental cycles of the first design and a set of corresponding fundamental cycles of the second design; (2) for each fundamental cycle of the first design and each corresponding fundamental cycle of the second design, verifying if the two corresponding fundamental cycles have the same number of registers; and (3) determining that the first design and the second design are temporally equivalent if the verification is true for all fundamental cycles.

The system then determines if all of the preceding verifications are TRUE (step 1110). If so, the system subsequently determines that the first design and the second design are sequentially equivalent (step 1112). Otherwise, if any of the above verifications is FALSE, the system determines that the first design and the second design are not sequentially equivalent (step 1114). Note that the above-described process facilitates performing sequential verifications on designs which are both globally retimed and sequentially optimized locally.

FIG. 12 illustrates a non-transitory computer readable storage medium 1200 in accordance with an embodiment of the present invention.

Performing Sequential Equivalence Verification on Multi-Level Designs

In some embodiments of the present invention, the above-described process for performing sequential equivalence verification on two-level designs can be applied to verify sequential equivalence of multi-level designs of any hierarchical complexity (three or more levels).

Note that the verification on multi-level designs can be performed in a bottom-up manner. More specifically, the system can start from the two lowest levels of the multi-level designs, and then apply the process for two-level design verification. If the verification passes, the system can combine the two lowest levels to create a combined level (with proper black-boxing), and then add the next lowest level to create a new two-level verification problem. Consequently, the system can recursively perform the two-level sequential equivalence checking in the bottom-up manner through the multi-level designs.

CONCLUSION

Embodiments of the present invention provide a compositional verification technique for verifying sequential equivalence of large designs that can be both globally retimed and sequentially optimized hierarchically. This proposed compositional verification technique is orthogonal to existing sequential equivalence checking techniques, and hence can be used concurrently with these sequential equivalence checking techniques.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing sequential equivalence checking between integrated circuit (IC) designs, the method comprising:

receiving a first IC design and a second IC design, wherein each of the first and second IC designs comprises a top design level and a bottom design level, and wherein the bottom design levels comprise one or more sub-blocks within the corresponding top design levels;

verifying, by computer, if each of the sub-blocks in the bottom design level of the first design is conditionally equivalent to a corresponding sub-block in the bottom design level of the second design, wherein two designs are conditionally equivalent if the two designs can become sequentially equivalent by adding registers on the input and output ports of the two designs;

verifying if the top design level of the first design is conditionally equivalent to the top design level of the second design;

verifying if the first design is temporally equivalent to the second design; and if the preceding verifications are true, determining that the first design and the second design are sequentially equivalent.

2. The method of claim 1, wherein verifying if a sub-block A in the first design is conditionally equivalent to a corresponding sub-block A' in the second design involves:
- identifying a set of input ports and a set of output ports for each of the two sub-blocks A and A';
- identifying a set of paths between the set of input ports and the set of output ports, wherein each path is an internal path from an input port to an output port within a corresponding sub-block;
- generating a set of equations for the set of paths, wherein the set of equations provides a set of conditions for the sub-blocks A and A' to be temporally equivalent;
- attempting to solve jointly the set of equations formulated for the set of paths to find a solution;
- if a solution is found, determining that the sub-blocks A and A' can be conditionally equivalent; and
- if no solution is found, determining that the sub-blocks A and A' cannot be conditionally equivalent.

3. The method of claim 2,
- wherein the sub-block A in the first design can include a sub-block in the bottom design level of the first design and the top design level of the first design; and
- wherein the sub-block A' in the second design can include a sub-block in the bottom design level of the second design and the top design level of the second design.

4. The method of claim 3, wherein while identifying a set of paths between the set of input ports and the set of output ports, if more than one path is found between a given input port and a given output port, the method further comprises choosing a path containing the least number of registers.

5. The method of claim 3, wherein generating the set of equations for the set of paths involves:
- for each of the set of paths from an input port x to an output port y, formulating an equation: $A_{xy} - A'_{xy} = (A'_x + A'_y) - (A_x + A_y)$,
  - wherein $A_{xy}$ and $A'_{xy}$ denote the number of registers on the path of the respective design blocks A and A', respectively;
  - wherein $A_x$ and $A_y$ denote the number registers to be added on port x and port y of the design block A, respectively; and
  - wherein $A'_x$ and $A'_y$ denote the number registers to be added on port x and port y of the design block A', respectively.

6. The method of claim 5, wherein solving jointly the set of equations formulated for the set of paths involves attempting a solution for the set of values $A_x$, $A_y$, $A'_x$ and $A'_y$ for the set of input ports and the set of output ports.

7. The method of claim 5, wherein solving jointly the set of equations formulated for the set of paths involves solving the set of equations using an integer linear programming (ILP) technique.

8. The method of claim 6, wherein if more than one solution is found for the set of equations, the method further comprises choosing a solution which minimizes the total number of registers added to the set of input ports and the set of output ports.

9. The method of claim 3, wherein verifying if a sub-block A in the first design is conditionally equivalent to a corresponding sub-block A' in the second design further involves:
- checking if the two sub-blocks are temporally equivalent; and
- if so, verifying if the two sub-blocks are sequentially equivalent.

10. The method of claim 9, wherein if the sub-blocks A and A' are not temporally equivalent, the method further comprises:
- modifying the sub-blocks A and A' to make the two sub-blocks temporally equivalent by adding registers to the associated ports; and
- verifying if the two modified sub-blocks are sequentially equivalent.

11. The method of claim 10, wherein performing sequential equivalence checking involves using a weak alignability technique to perform the sequential equivalence checking.

12. The method of claim 1, wherein verifying if the top design level of the first design is conditionally equivalent to the top design level of the second design involves:
- creating a top-level block from the top design level by black-boxing the sub-blocks of the respective bottom design level; and
- verifying if the top-level block of the first design is conditionally equivalent to the top-level block of the second design.

13. The method of claim 1, wherein verifying if the first design is temporally equivalent to the second design involves:
- identifying a set of fundamental cycles of the first design and a set of corresponding fundamental cycles of the second design;
- for each fundamental cycle of the first design and each corresponding fundamental cycle of the second design, verifying if the two corresponding fundamental cycles have the same number of registers; and
- if so, determining that the first design and the second design are temporally equivalent.

14. The method of claim 1, wherein the method is used to perform sequential equivalence checking on designs which are both globally retimed and locally sequentially optimized.

15. The method of claim 1, wherein the method further comprises:
- receiving a third design and a fourth design, wherein each of the third and fourth designs comprises multiple corresponding design levels;
- identifying two adjacent design levels of the third design and the corresponding two adjacent design levels of the fourth design from the multiple corresponding design levels;
- verifying if:
  - each of the two adjacent design levels of the third design is conditionally equivalent to each of the corresponding two adjacent design levels of the fourth design; and
  - the higher level of the two adjacent design levels of the third design is temporally equivalent to the higher level of the corresponding two adjacent design levels of the fourth design; if so,
- moving up one design level and creating next two adjacent design levels within the multiple design levels; and
- repeating the preceding verifications for the next two adjacent design levels between the third and fourth designs,
- thereby recursively performing sequential equivalence checking in a bottom-up manner through the multiple design levels of the third and fourth designs.

16. A non-transitory computer-readable storage medium storing instructions that when executed by a computer cause the computer to perform a method for performing sequential equivalence checking between integrated circuit (IC) designs, the method comprising:
- receiving a first IC design and a second IC design, wherein each of the first and second IC designs comprises a top design level and a bottom design level, and wherein the bottom design levels comprise one or more sub-blocks within the corresponding top design levels;

verifying if each of the sub-blocks in the bottom design level of the first design is conditionally equivalent to a corresponding sub-block in the bottom design level of the second design, wherein two designs are conditionally equivalent if the two designs can become sequentially equivalent by adding registers on the input and output ports of the two designs;

verifying if the top design level of the first design is conditionally equivalent to the top design level of the second design;

verifying if the first design is temporally equivalent to the second design; and if the preceding verifications are true, determining that the first design and the second design are sequentially equivalent.

17. The non-transitory computer-readable storage medium of claim 16, wherein verifying if a sub-block A in the first design is conditionally equivalent to a corresponding sub-block A' in the second design involves:

identifying a set of input ports and a set of output ports for each of the two sub-blocks A and A';

identifying a set of paths between the set of input ports and the set of output ports, wherein each path is an internal path from an input port to an output port within a corresponding sub-block;

generating a set of equations for the set of paths, wherein the set of equations provides a set of conditions for the sub-blocks A and A' to be temporally equivalent;

attempting to solve jointly the set of equations formulated for the set of paths to find a solution;

if a solution is found, determining that the sub-blocks A and A' can be conditionally equivalent; and if no solution is found, determining that the sub-blocks A and A' cannot be conditionally equivalent.

18. The non-transitory computer-readable storage medium of claim 17, wherein the sub-block A in the first design can include a sub-block in the bottom design level of the first design and the top design level of the first design; and wherein the sub-block A' in the second design can include a sub-block in the bottom design level of the second design and the top design level of the second design.

19. The non-transitory computer-readable storage medium of claim 18, wherein while identifying a set of paths between the set of input ports and the set of output ports, if more than one path is found between a given input port and a given output port, the method further comprises choosing a path containing the least number of registers.

20. The non-transitory computer-readable storage medium of claim 18, wherein generating the set of equations for the set of paths involves:

for each of the set of paths from an input port x to an output port y, formulating an equation: $A_{xy} - A'_{xy} = (A'_x + A'_y) - (A_x + A_y)$, wherein $A_{xy}$ and $A'_{xy}$ denote the number of registers on the path of the respective design blocks A and A', respectively;

wherein $A_x$ and $A_y$ denote the number registers to be added on port x and port y of the design block A, respectively; and wherein $A'_x$ and $A'_y$ denote the number registers to be added on port x and port y of the design block A', respectively.

21. The non-transitory computer-readable storage medium of claim 20, wherein solving jointly the set of equations formulated for the set of paths involves attempting a solution for the set of values $A_x$, $A_y$, $A'_x$ and $A'_y$ for the set of input ports and the set of output ports.

22. The non-transitory computer-readable storage medium of claim 20, wherein solving jointly the set of equations formulated for the set of paths involves solving the set of equations using an integer linear programming (ILP) technique.

23. The non-transitory computer-readable storage medium of claim 21, wherein if more than one solution is found for the set of equations, the method further comprises choosing a solution which minimizes the total number of registers added to the set of input ports and the set of output ports.

24. The non-transitory computer-readable storage medium of claim 18, wherein verifying if a sub-block A in the first design is conditionally equivalent to a corresponding sub-block A' in the second design further involves:

checking if the two sub-blocks are temporally equivalent; and if so, verifying if the two sub-blocks are sequentially equivalent.

25. The non-transitory computer-readable storage medium of claim 24, wherein if the sub-blocks A and A' are not temporally equivalent, the method further comprises:

modifying the sub-blocks A and A' to make the two sub-blocks temporally equivalent by adding registers to the associated ports; and verifying if the two modified sub-blocks are sequentially equivalent.

26. The non-transitory computer-readable storage medium of claim 25, wherein performing sequential equivalence checking involves using a weak alignability technique to perform the sequential equivalence checking.

27. The non-transitory computer-readable storage medium of claim 16, wherein verifying if the top design level of the first design is conditionally equivalent to the top design level of the second design involves:

creating a top-level block from the top design level by black-boxing the sub-blocks of the respective bottom design level; and verifying if the top-level block of the first design is conditionally equivalent to the top-level block of the second design.

28. The non-transitory computer-readable storage medium of claim 16, wherein verifying if the first design is temporally equivalent to the second design involves:

identifying a set of fundamental cycles of the first design and a set of corresponding fundamental cycles of the second design;

for each fundamental cycle of the first design and each corresponding fundamental cycle of the second design, verifying if the two corresponding fundamental cycles have the same number of registers; and if so, determining that the first design and the second design are temporally equivalent.

29. The non-transitory computer-readable storage medium of claim 16, wherein the method is used to perform sequential equivalence checking on designs which are both globally retimed and locally sequentially optimized.

30. The non-transitory computer-readable storage medium of claim 16, wherein the method further comprises:

receiving a third design and a fourth design, wherein each of the third and fourth designs comprises multiple corresponding design levels;

identifying two adjacent design levels of the third design and the corresponding two adjacent design levels of the fourth design from the multiple corresponding design levels;

verifying if:

each of the two adjacent design levels of the third design is conditionally equivalent to each of the corresponding two adjacent design levels of the fourth design; and the higher level of the two adjacent design levels of the third design is temporally equivalent to the higher level of the corresponding two adjacent design levels of the fourth design; if so, moving up one design level and creating next two adjacent design levels within the multiple design levels; and repeating the preceding verifications for the next two adjacent design levels between the third and fourth designs, thereby recursively performing sequential equivalence checking in a bottom-up manner through the multiple design levels of the third and fourth designs.

31. A system that performs sequential equivalence checking between integrated circuit (IC) designs, comprising:

a processor;
a memory;
a receiving mechanism configured to receive a first IC design and a second IC design, wherein each of the first and second IC designs comprises a top design level and a bottom design level, and wherein the bottom design levels comprise one or more sub-blocks within the corresponding top design levels;

a verification mechanism configured to verify if each of the sub-blocks in the bottom design level of the first design is conditionally equivalent to a corresponding sub-block in the bottom design level of the second design, wherein two designs are conditionally equivalent if the two designs can become sequentially equivalent by adding registers on the input and output ports of the two designs; and wherein the verification mechanism is further configured to:

verify if the top design level of the first design is conditionally equivalent to the top design level of the second design; and verify if the first design is temporally equivalent to the second design; and determine that the first design and the second design are sequentially equivalent if the preceding verifications are true.

* * * * *